United States Patent Office 3,124,503
Patented Mar. 10, 1964

3,124,503
FORMALDEHYDE PULPING
Karsten Andreas Zachariasen, Memphis, Tenn., assignor to The Buckeye Cellulose Corporation, Cincinnati, Ohio, a corporation of Ohio
No Drawing. Filed Mar. 30, 1962, Ser. No. 183,748
3 Claims. (Cl. 162—9)

This invention relates to new and useful improvements in the manufacture of chemical pulp from subdivided lignocellulosic materials derived from the angiosperm or deciduous class of trees, which is commonly referred to as hardwoods, and it will be understood that any otherwise undesignated reference to lignocellulose throughout this application refers to wood of the aforementioned classification. More particularly this invention relates to the discovery of a new and useful digestion process for the fiberization and purification of lignocellulosic materials. The process provides for the use of an organic chemical as the active agent of digestion which under wide ranges of pH in the digestion step has been discovered to be a superior agent for effecting the removal of lignins and pentosans from native celluloses. The present digestion process results in purified, or purified and modified, chemical pulps which have utility in the diversified processes of the regenerated cellulose, cellulose derivative, and paper industries.

A great number of inorganic and organic reagents have been investigated for use in the digestion of both deciduous and coniferous lignocellulosic materials for the purpose of releasing the cellulosic fibers from their natural bound condition with lignin, pentosans and other encrusting materials. Of these the inorganic reagents have proved most practical to the present time as exemplified by the widespread use of the "soda," "sulphite," and "sulphate" processes for digestion. These processes and modifications in the techniques for their utilization are so well known as to require no further elucidation. In contrast to these processes, the attempted use of organic digestion liquors has been largely unsuccessful because of poor process economy coupled with the lack of sufficiently superior results to make their use attractive in a highly competitive manufacturing operation.

It is, therefore, an object of this invention to provide a digestion process using an organic pulping agent for the purification of lignocelluloses which is advantageous in being capable of producing a purified, digested chemical pulp containing stable formal linkages directly from native lignocellulose and wherein the undecomposed digestion reagent can be recovered by evaporation-distillation techniques for subsequent reuse.

It is also an object of this invention to provide a digestion process wherein the specific organic digestion reagent of this invention, related organic materials releasing the specific reagent, and/or inorganic pH controlling agents, such as bases and acids, can be proportioned so as to result in a higher or lower level of stable formal linkage content in the digested chemical pulp.

It is a further object of this invention to provide a digestion process wherein the specific active organic reagent of the present invention and an organic substance of basic properties releasing the active agent on decomposition can be combined in order to achieve pH control and obtain the stated benefits together with the recovery of lignin by precipitation due to the dilution with water of the used digestion liquor.

Further objects and advantageous features will appear from the following detailed description of the present digestion process and from the accompanying examples.

Specifically, this invention is based on the discovery that formaldehyde, which was previously known to be a modifier of previously digested and bleached cellulose, possesses a surprising and superior facility at both high and low ranges of pH for the removal of lignin and other substances from their bound condition in hardwood lignocellulose structures. At the same time the formaldehyde renders any remaining lignin particularly susceptible to extraction with dilute aqueous solutions of sodium hydroxide. There is also contemplated a novel digestion liquor composed of formaldehyde and hexamethylenetetramine whereby a digestion pH can be varied to produce pulps containing stable formal linkages. The remarkable abilities of the present digestion reagent to effect the pulping of hardwood at high and low pH ranges coupled with its cellulose modification properties makes possible the use of this unique digestion procedure to produce directly from comminuted hardwood lignocellulosic material, such as wood chips, modified fibers containing stable formal linkages or fibers containing unstable hemi-acetal linkages, all of which possess a low percentage of lignins, pentosans and other soluble wood components.

The digestion process herein disclosed stems from the discovery and extensions thereof that the organic chemical, namely formaldehyde, disclosed in the United States patent to Julius Kantorowicz, No. 2,298,260, granted October 6, 1942, posseses not only the therein taught property of desirably converting already prepared wood and paper pulps "into a condition in which they behave substantially like the alpha cellulose," but has also superior lignin and pentosan removal properties in a digestion process as applied to hardwoods. Applicants have therefore discovered a digestion process which produces the results disclosed by the aforementioned patent, but with the important technical and economical advantage that the final product proceeds directly from the native lignocellulose because of applicant's discovery that formaldehyde is in fact a superior delignifying agent as used in the digestion of hardwods.

Specifically, the digestion process contemplated by the present invention comprises subdividing hardwood lignocellulosic material by any of the known methods, including the use of commercial equipment for the production of wood chips, and adding to said material from about two to about ten times its bone dry weight of from about a 25% to about a 50% aqueous solution, calculated on a formaldehyde equivalent weight basis, of a delignifying and cellulose modifying agent selected from the group consisting of formaldehyde, formaldehyde-releasing substances and mixtures thereof, and digesting the said material in said solution at a temperature of about 130° C. to about 200° C. for a period of about 5 to 300 minutes, depending on the reagent concentration, the severity of the digestion conditions and the characteristics desired in the final pulp product.

Operation of the digestion at pH's of 7–11 will result in chemical pulp, containing a small percentage of stable formal linkages, which chemical pulp can be subsequently extracted with dilute sodium hydroxide solutions, chlorinated and bleached in the normal bleaching sequences used in pulp processing. The pH's referred to herein are, in each instance, the final pH of the liquor after digestion. Any of the inorganic pH controlling agents known for use in the "soda," "sulphite," and "sulphate" processes for digestion are suitable for use in the present invention.

If the digestion process is carried out at pH's ranging from 1 to 7 the resulting chemical pulp will be found to resist dissolving in the cupri-ethylene diamine solutions normally used in pulp viscosity tests and to contain a greater percentage of stable formal linkages. Under acidic conditions the stable formal linkage content increases directly with increases in formaldehyde concentration and the severity of digestion conditions. The pulp containing stable formal linkages can be extracted with dilute sodium hydroxide solutions, chlorinated and bleached by normal procedures. In this manner applicant has found it possible to proceed directly from native lignocellulosic materials to modified or unmodified chemical pulp, whereas it would have been expected by a person skilled in the art that the action of formaldehyde directly on lignocellulose would tend to polymerize the lignin and associated materials still more tightly to the cellulose fibers in a physical and chemical sense than they are in untreated lignocellulose.

Digestion of lignocellulose in the absence of inorganic pH controlling agents with formaldehyde alone, because of the acidic nature of a pulp digestion employing water alone, has been found to result in modified celluloses containing stable formal linkages. It has also been found possible to control the pH from about 3 to about 10 by using a digestion liquor comprised of varying proportions of aqueous solutions of mixtures of formaldehyde and hexamethylenetetramine, which latter substance is an organic base as well as a formaldehyde-releasing substance.

It is noted that the present digestion process, while superior in lignin and pentosan removal among systems utilizing organic digestion liquors, has an added advantage in rendering the lignins, pentosans, and other incrustants which it does not directly solubilize, highly susceptible to the action of a subsequent dilute aqueous sodium hydroxide extraction wherein their extraction can be accomplished. A dilute aqueous sodium hydroxide extraction as employed herein refers to the caustic extraction steps employed in modern bleaching sequences.

In the following examples preferred embodiments of this invention are illustrated, but it is understood that the examples are not to be construed as limiting the scope of the invention. The percentages set forth in the examples and elsewhere herein are given on a weight basis.

EXAMPLE I

One hundred grams of gum wood chips of normal commercial size were placed in a 1000 cc. autoclave fitted with a pressure gauge and a vent valve. An amount of 37 percent aqueous solution of formaldehyde equal to 10 times by weight of the bone dry wood was next added to the autoclave as a digestion liquor, and the autoclave was then tightly closed.

The autoclave was next heated in a glycerol bath equipped with a thermostat at a temperature of 170° C. for a period of 180 minutes. The final pH of the digestion liquor was between 2.5 and 3. The digested pulp was then washed with hot water and with 0.5% aqueous NaOH solution and dried to determine the yield based on the original weight of bone dry chips. Table I below gives the results obtained from this digestion experiment.

*Table I*

| Pulp, Percent Yield | Percent Pentosans in Product Pulp | Percent Lignin in Product Pulp | $KMnO_4$, # |
|---|---|---|---|
| 43 | 2.6 | 5.0 | 13.2 |

It was noted that the pulp from this formaldehyde digestion was of an exceptionally light color suitable for bleaching and did not dissolve in the cupri-ethylene diamine solutions normally used in testing pulp viscosity. Moreover, the 2.6% pentosan content is remarkably low for hardwood. The lignin removed from the wood can be recovered by diluting the used digestion liquor with water to cause it to precipitate. If sufficient amounts of an inorganic base, such as sodium hydroxide, are added to the digestion liquor to make the final digestion liquor basic, the resulting pulp is soluble in cupri-ethylene diamine solutions. The lignin in the digestion liquor of this example was precipitated and recovered by adding water to the liquor. The undecomposed formaldehyde remaining in the digestion liquor was recovered by normal distillation techniques.

EXAMPLE II

One hundred grams of gum wood chips of normal commercial size were placed in a 1000 cc. autoclave fitted with a pressure gauge and a vent valve. An amount of 30 percent aqueous solution of hexamethylenetetramine equal to 10 times by weight of the bone dry wood was next added to the autoclave as a digestion liquor, and the autoclave was tightly closed.

The autoclave was next heated in a glycerol bath equipped with a thermostat at a temperature of 170° C. for a period of 180 minutes. The final pH of the digestion liquor was 9.5. The digested pulp was washed and dried in the manner of Example I. The data obtained from this digestion are expressed in Table II below.

*Table II*

| Percent Yield | Pentosan contnet of Pulp, Percent | Lignin contnent of Pulp, Percent | $KMnO_4$,# |
|---|---|---|---|
| 43 | 10.7 | 4.0 | 19.2 |

The resulting pulp dissolved readily in the cupri-ethylene diamine solutions normally used in testing pulp viscosity. Substantially the same results can be obtained with a 30 percent aqueous solution of a hexamethylenetetramine-formaldehyde mixture containing one part by weight of formaldehyde to two parts by weight of hexamethylenetetramine.

EXAMPLE III

Using the procedure of Example I modified as indicated, digestions comparing the action of formaldehyde, acetaldehyde and benzaldehyde at two levels of time and temperature with a liquid to bone dry wood ratio of 9 to 1 were made with the results expressed below in Table III and Table IV. The pulps of this example did not receive an extraction with dilute sodium hydroxide as did those of Example I. The results of a blank using water alone as the digestion liquor is also shown in Table III.

*Table III*

[15 minute digestions at 200° C.]

| Digestion Liquor Concentration | Pulp, percent Yield | Percent Lignin in Product Pulp | Percent Pentosans in Product Pulp | Percent of Component removed from Original Wood | |
|---|---|---|---|---|---|
| | | | | Lignin | Pentosan |
| 37% Formaldehyde | 48.3 | 9.9 | 1.8 | 77.5 | 94.7 |
| 37% Benzaldehyde | 60.4 | 18.6 | 6.2 | 47.2 | 76.6 |
| 37% Acetaldehyde | 84.5 | 21.9 | 14.7 | 12.7 | 23.0 |
| 100% Water (Blank) | 64.8 | 24.3 | 4.5 | 26.0 | 81.7 |

*Table IV*

[120 minute digestions at 175° C.]

| Digestion Liquor Concentration | Pulp, percent Yield | Percent Lignin in Product Pulp | Percent Pentosans in Product Pulp | Percent of Component removed from Original Wood | |
|---|---|---|---|---|---|
| | | | | Lignin | Pentosan |
| 37% Formaldehyde | 46.3 | 8.2 | 0.8 | 82.1 | 97.7 |
| 37% Benzaldehyde | 54.0 | 15.8 | 3.5 | 59.9 | 88.1 |
| 37% Acetaldehyde | 73.8 | 26.6 | 6.1 | 7.6 | 72.2 |

The superiority of formaldehyde in lignin and pentosan removal is evident from the data tabulated in the above tables and in addition the use of formaldehyde or formaldehyde-releasing substances offers the advantage of controlled cross-linkage.

EXAMPLE IV

Pulp prepared by digesting wood chips with formaldehyde in the manner of Example I modified by the addition of amounts of organic base in the form of hexamethylenetetramine as required to result in a final digestion liquor pH of 9.5 was found to dissolve in cellulose solvents such as cupriethylene diamine.

In contrast, pulps prepared from wood chips with formaldehyde together with such amounts of sulfuric acid and sodium hydroxide as were required to result in a final pH of 1–7 increased their tendency to become insoluble in normal cellulose solvents as the pH decreased.

The pulps of this invention have a wide potential use in present regenerated cellulose and paper making processes. To the best of applicant's knowledge, a process for the production of pulps with a controlled percentage of formal cross-linkages directly from native lignocellulose concomitantly with superior lignin and pentosan removal by the use of formaldehyde, or formaldehyde-releasing substances in digestion has not heretofore been disclosed.

Having disclosed and described the present invention in all its useful forms, what is claimed is:

1. A process for producng pulp from subdivided hardwood material wherein said material is digested at a temperature of about 130° C. to about 200° C. for a period of about 5 to about 300 minutes in the presence of about two to about ten times its bone dry weight of an aqueous solution containing about 25% to about 50% of formaldehyde, thereby substantially completely releasing the lignin in said material from its bound condition with the cellulosic material and converging any remaining lignin to a condition wherein it is readily extractable with a dilute aqueous solution of sodium hydroxide, the final pH of the digesting solution being from about 1 to about 11, recovering from the digestion solution a pulp having a substantially reduced lignin and pentosan content as compared with the undigested lignocellulosic material, and extracting the recovered pulp with a dilute aqueous solution of sodium hydroxide.

2. A process for producing pulp from subdivided hardwood material which comprises adding to said material from about two to about ten times its bone dry weight of an aqueous solution containing from about 25% to about 50% of a delignifying and pentosan removing mixture comprised of formaldehyde and hexamethylenetetramine in such proportion as to control the final pH of the digestion liquors from about three to about ten, digesting the said material in said solution at a temperature of about 130° C. to about 200° C. for a period of about five to about 300 minutes, thereby substantially completely releasing the lignin from its bound condition with the cellulosic material and converting any remaining lignin to a condition wherein it is readily extractable with a dilute aqueous solution of sodium hydroxide, extracting the pentosans from said subdivided material, simultaneously converting the cellulose to formal derivatives thereof in the pH range of three to seven and substantially completely separating the resulting fibrous material from the digestion liquor.

3. A process for producing pulp from subdivided hardwood material as described in claim 2 wherein the final pH of the digestion liquors is controlled to from about 7 to about 10.

References Cited in the file of this patent

UNITED STATES PATENTS

| | | |
|---|---|---|
| 2,010,635 | Kantorowicz | Aug. 6, 1935 |
| 2,042,705 | Dreyfus | June 2, 1936 |
| 2,070,585 | Dreyfus | Feb. 16, 1937 |
| 2,760,861 | Furman | Aug. 28, 1956 |